United States Patent
Duan et al.

(10) Patent No.: US 8,788,796 B2
(45) Date of Patent: Jul. 22, 2014

(54) TECHNIQUE FOR SIMULATING FLOATING-POINT STACK OPERATION INVOLVING CONVERSION OF CERTAIN FLOATING-POINT REGISTER NUMBERS BASED ON A TOP-OF-STACK POINTER AND MODULO FUNCTION

(75) Inventors: Wei Duan, Haidian District (CN); Xiaoyu Li, Haidian District (CN)

(73) Assignee: Loongson Technology Corporation Limited, Beijing (CN)

( * ) Notice: Subject to any disclaimer, the term of this patent is extended or adjusted under 35 U.S.C. 154(b) by 1079 days.

(21) Appl. No.: 12/746,882

(22) PCT Filed: Dec. 12, 2008

(86) PCT No.: PCT/CN2008/002005
§ 371 (c)(1),
(2), (4) Date: Jun. 8, 2010

(87) PCT Pub. No.: WO2009/094827
PCT Pub. Date: Aug. 6, 2009

(65) Prior Publication Data
US 2010/0274991 A1    Oct. 28, 2010

(30) Foreign Application Priority Data

Dec. 28, 2007  (CN) .......................... 2007 1 0304656

(51) Int. Cl.
*G06F 9/318* (2006.01)
*G06F 9/30* (2006.01)
*G06F 9/302* (2006.01)

(52) U.S. Cl.
CPC ........ *G06F 9/30134* (2013.01); *G06F 9/30101* (2013.01); *G06F 9/3001* (2013.01); *G06F 9/30181* (2013.01)
USPC ............ 712/227; 712/202; 712/222; 712/226

(58) Field of Classification Search
CPC .............. G06F 9/3001; G06F 9/30101; G06F 9/30134; G06F 9/30163; G06F 9/30181
USPC .......................... 712/202, 222, 226, 227, 229
See application file for complete search history.

(56) References Cited

U.S. PATENT DOCUMENTS

| 5,673,407 A | 9/1997 | Poland et al. | |
| 5,852,726 A * | 12/1998 | Lin et al. | 712/200 |

(Continued)

FOREIGN PATENT DOCUMENTS

| CN | 87100507 A | 11/1987 |
| CN | 1746850 A | 3/2006 |
| CN | 101216756 B | 3/2011 |

*Primary Examiner* — David J Huisman
(74) *Attorney, Agent, or Firm* — Cesari and McKenna, LLP

(57) ABSTRACT

A Reduced Instruction Set Computing (RISC) processor is capable of emulating operation of a floating-point register stack. The RISC processor may include a floating-point register file containing a plurality of floating-point registers, a decoding section for decoding operation instructions, and a floating-point operation section. The RISC processor may also include a control register for controlling status of floating-point registers, and for controlling the decoding section and the floating-point operation section, to thereby emulate a floating-point register stack using the floating-point register file. The decoding section may include a pointer register for maintaining a stack operation pointer, and for storing a value of the stack operation pointer. The floating-point operation section may also include a pointer operation module for operating the pointer register, for emulating stack operation of the stack pointer of the pointer register, and for modifying and monitoring the stack pointer during emulation of floating-point register stack.

17 Claims, 4 Drawing Sheets

(56) References Cited

U.S. PATENT DOCUMENTS 6,651,159 B1 11/2003 Ramesh et al.
6,725,361 B1 4/2004 Rozas et al.
7,363,475 B2 * 4/2008 Shelor .......................... 712/227
2004/0015678 A1 * 1/2004 Strom .......................... 712/202
2006/0236077 A1 10/2006 Strom et al.

* cited by examiner

| 31 26 | 25 21 | 20 16 | 15 11 | 10 6 | 5 0 |
|---|---|---|---|---|---|
| SPECIAL2 011100 | 00000 | 00000 | 00000 | op 00000 | TopMode 110001 |
| 6 | 5 | 5 | 5 | 5 | 6 |

Fig. 3

| 31 26 | 25 21 | 20 16 | 15 11 | 10 6 | 5 0 |
|---|---|---|---|---|---|
| SPECIAL2 011100 | 00000 | 00000 | 00000 | op 00001 | TopMode 110001 |
| 6 | 5 | 5 | 5 | 5 | 6 |

Fig. 4

| 31 26 | 25 21 | 20 16 | 15 11 | 10 6 | 5 0 |
|---|---|---|---|---|---|
| SPECIAL2 011100 | 00000 | 00000 | 00000 | op 00000 | TopMode 110110 |
| 6 | 5 | 5 | 5 | 5 | 6 |

Fig. 5

| 31 26 | 25 21 | 20 16 | 15 11 | 10 6 | 5 0 |
|---|---|---|---|---|---|
| SPECIAL2 011100 | 00000 | 00000 | 00000 | op 00001 | TopMode 110110 |
| 6 | 5 | 5 | 5 | 5 | 6 |

Fig. 6

| 31 26 | 25 21 | 20 16 | 15 11 | 10 6 | 5 0 |
|---|---|---|---|---|---|
| SPECIAL2 011100 | 00000 | 00000 | rd | op 00011 | TopMode 110110 |
| 6 | 5 | 5 | 5 | 5 | 6 |

Fig. 7

| 31 26 | 25 21 | 20 16 | 15 11 | 10 6 | 5 0 |
|---|---|---|---|---|---|
| SPECIAL2 011100 | 00000 | 00000 | 00000 | imm | op 10 | TopMode 110110 |
| 6 | 5 | 5 | 5 | 5 | 6 |

TECHNIQUE FOR SIMULATING FLOATING-POINT STACK OPERATION INVOLVING CONVERSION OF CERTAIN FLOATING-POINT REGISTER NUMBERS BASED ON A TOP-OF-STACK POINTER AND MODULO FUNCTION

CROSS-REFERENCE TO RELATED APPLICATIONS

This application is the National Stage of International Application No. PCT/CN2008/002005, filed on Dec. 12, 2008, which claims the priority of Chinese Patent Application No. 200710304656.2, filed on Dec. 28, 2007. The contents of all applications are hereby incorporated by reference in their entirety.

FIELD OF THE INVENTION

The present invention relates to the technical field of microprocessors, and more particularly, to a Reduced Instruction Set Computing (RISC) processor device and a method of emulating a floating-point stack operation and performing a stack operation like stack push/pop of floating-point data in the processor device.

BACKGROUND OF THE INVENTION

A Central Processing Unit (CPU), "microprocessor" for short, is a core unit of a computer. The instruction set and design code (system architecture) adopted by a microprocessor are the primary characteristics of a computer, and they determine the types of the peripheral equipment and application software that a computer needs to use.

At present, there are two popular processor system architectures in the world: one is the Reduced Instruction Set Computing (RISC) processor system architecture represented by the MIPS32/64 Instruction Set of MIPS Technologies, Inc., and the other is the Complex Instruction Set Computing (CISC) processor system architecture represented by X86 of Intel Corporation. The CISC processor involves a huge number of instructions, some of which can execute functions quite complicated and generally need many clock periods to execute them whereas the RISC processor uses a relatively small quantity of available instructions to execute a group of simpler functions at a higher speed. The program software running on a processor adopting a different system architecture needs to be written according to the system architecture of the processor, and the application software running on X86 usually cannot run on a computer having a MIPS Instruction Set-based RISC processor, i.e., they are incompatible as what's always said.

However, computer manufacturers expect to save on costs of software development by running more existing software on a microprocessor of a system architecture manufactured by themselves and, meanwhile, to attain the object of maximizing their market shares.

In order to solve this problem, virtual machines emerge as the times require. Generally, a CPU computer having a single type of system architecture is called a host; meanwhile, a CPU environment of an unrelated system architecture type, which needs to be emulated by the host, is called an object machine, and an application program, which can spur the host to execute one or more host instructions to run the software coded for the object machine in response to the given object machine instruction, is needed and is called a virtual machine.

Virtual machines existing currently include SimOS, Quick Emulator (QEMU), Transmeta and so on. But, the existing virtual machines cost too much overhead and have a too low execution efficiency when they are running because of tremendous differences among various system architectures, so it's very difficult to apply them to practical operations.

Since the X86 processor system architecture is an architecture type popularly used in personal computers (PCs) now, most of virtual machines take the X86 processor system architecture as the object machine so that all of them need to solve the problem of being compatible with the X86 processor, and the knotty problem known to all is to emulate the unique floating-point stack mechanism of the X86 processor. Generally, a floating-point register stack is provided in a CISC processor, such as X86, and the majority of floating-point operations are performed with the participation of a register stack. Except the X86 processor, other processors, especially the MIPS Instruction Set-based RISC processor, don't have a similar architecture. Accordingly, the hot problem urgently to be solved by numerous virtual machine research and development departments is how to carry out floating-point translation on a virtual machine.

The floating-point operations of the X86 processor provide stack push (floating-point loading instruction), stack pop (floating-point storing instruction), floating-point operation instruction, and some other assistant instructions. A program may push the floating-point data of a memory into a floating-point register stack through the floating-point loading instruction, perform an operation on the floating-point data through the floating-point operation instruction, carry out stack pop through the floating-point storing instruction, and store the content of a top-of-stack register in a memory cell.

Such floating-point operation manner is unique to the CISC processor, such as the X86 processor. Processors of other types, such as the MIPS Instruction Set-based RISC processor, substantially don't have a similar operation manner.

Generally speaking, several general floating-point registers are provided within a non-CISC processor, such as the MIPS Instruction Set-based RISC processor, these floating-point registers are numbered in a unified way, an instruction directly access a fixed floating-point register via these numbers. However, in the X86 processor, the register operated by the instruction changes as a top-of-stack pointer changes. Generally, the non-CISC processor, such as the RISC processor, needs to clear a space within the memory to maintain a emulated X86 floating-point register stack, in order to solve the problem of binary data translation.

Chinese application NO. 200410074532.6 discloses a method of processing floating-point operations in X86 in binary translation, comprising: arranging a floating-point stack in the running environment for emulating the physical floating-point stack in X86; and processing every basic block in a source binary program in sequence through the processing of floating-point register mapping and the normalization method. By way of mapping the source register of X86 using registers of the object machine, it is ensured that the floating-point operation of the X86 processor is also performed by registers on the object machine, thereby ensuring the operation efficiency; meanwhile, by means of the normalization method, it is ensured that the inlet of every basic block satisfies the hypothesis that the value of top every time is the same.

Although all kinds of X86 floating-point operations can be emulated correctly in the prior art, the efficiency is too low to make progress in performance.

SUMMARY OF THE INVENTION

The problem to be solved by the present invention is to provide a RISC processor device and a method of emulating a floating-point stack operation thereof, which can support a floating-point stack operation on a RISC processor so as to facilitate virtual machines of different architectures to perform binary translation, enhance the efficiency of virtual machines and improve the compatibility of the processor.

The RISC processor device provided for carrying out the present invention comprises: a floating-point register file containing a plurality of floating-point registers; a decoding section for decoding operation instructions of the RISC processor; a floating-point operation section connected to the decoding section for reading and writing the floating-point register file according to the output value of the decoding section so as to perform a floating-point operation; and a control register for controlling the status of the floating-point registers and controlling the decoding section and the floating-point operation section to emulate a floating-point register stack operation using the floating-point register file; wherein the decoding section includes a pointer register for maintaining a stack operation pointer and storing the value of the stack operation pointer, and the floating-point operation section includes a pointer operation module, when the floating-point register stack operation is emulated, the pointer operation module operates the pointer register so as to emulate the stack operation of the stack operation pointer, modify and monitor the status of the stack operation pointer.

The control register maintains a stack enable bit, wherein the stack enable bit denotes that the processor will emulate the floating-point register stack operation when it is set to 1, and that the processor will not emulate the floating-point register stack operation when it is set to 0.

The floating-point register file contains 32 floating-point registers numbered 0 to 31.

The stack operation pointer is a stack operation pointer indicating the operations of reading, writing, plus 1 and minus 1.

When the stack enable bit in the control register is set to 1, the decoding section converts the numbers of 8 registers among the 32 floating-point registers according to the value of the stack operation pointer, so as to emulate the stack registers numbered 0 to 7 in the floating-point register stack of an X86 processor.

To achieve the object of the present invention, a method of emulating floating-point stack operation in an RISC processor is provided. The RISC processor comprises: a floating-point register file containing a plurality of floating-point registers; a decoding section for decoding operation instructions of the RISC processor; a floating-point operation section connected to the decoding section for reading and writing the floating-point register file according to the output value of the decoding section so as to perform a floating-point operation; and a control register for controlling the decoding section and the floating-point operation section to emulate a floating-point register stack operation using the floating-point register file; wherein the control register maintains a stack enable bit, the decoding section includes a pointer register, and the floating-point operation section includes a pointer operation module. The method comprises the following steps:

Step A: determining if the floating-point registers are selected to emulate a floating-point register stack operation according to the stack enable bit, and setting the pointer register; and Step B: operating the pointer register so as to emulate the stack operation of a stack operation pointer, and modify and monitor the status of the stack operation pointer when the floating-point register stack operation is emulated.

The Step A includes the following steps:

Step A1: selecting a bit in the control register as a floating-point stack enable bit, wherein the stack enable bit denotes that the RISC processor emulates a floating-point register stack of X86 and performs a floating-point register stack operation when it is set to 1, and that the RISC processor neither emulates a floating-point register stack of X86 nor performs a floating-point register stack operation but operates according to a normal process when it is set to 0; and Step A2: setting at least 3 bits of the pointer register for storing the value of the stack operation pointer.

The Step B includes the following steps:

setting a stack operation mode by setting the floating-point stack enable bit to 1 to allow a user to emulate a floating-point register stack operation;

clearing a stack operation mode by setting the floating-point stack enable bit to 0 to forbid a user to emulate a floating-point register stack operation;

increasing the value of the stack operation pointer by 1;

decreasing the value of the stack operation pointer by 1;

reading the value of the stack operation pointer; and writing the value of the stack operation pointer.

BRIEF DESCRIPTION OF THE DRAWINGS

FIG. 3 is a schematic diagram illustrating a code of an instruction for setting the enable bit to 1 to set a stack operation mode, based on the MIPS Instruction Set, according to the embodiments of the present invention;

FIG. 4 is a schematic diagram illustrating a code of an instruction for setting the enable bit to 0 to clear a stack operation mode, based on the MIPS Instruction Set, according to the embodiments of the present invention;

FIG. 5 is a schematic diagram illustrating a code of an instruction for increasing the value of the stack pointer by 1, based on the MIPS Instruction Set, according to the embodiments of the present invention;

FIG. 6 is a schematic diagram illustrating a code of an instruction for decreasing the value of the stack pointer by 1, based on the MIPS Instruction Set, according to the embodiments of the present invention;

FIG. 7 is a schematic diagram illustrating a code of an instruction for reading the value of the stack pointer, based on the MIPS Instruction Set, according to the embodiments of the present invention; and FIG. 8 is a schematic diagram illustrating a code of an instruction for writing the value of the stack pointer, based on the MIPS Instruction Set, according to the embodiments of the present invention.

THE BEST WAY TO CARRY OUT THE PRESENT INVENTION

Figure 1:
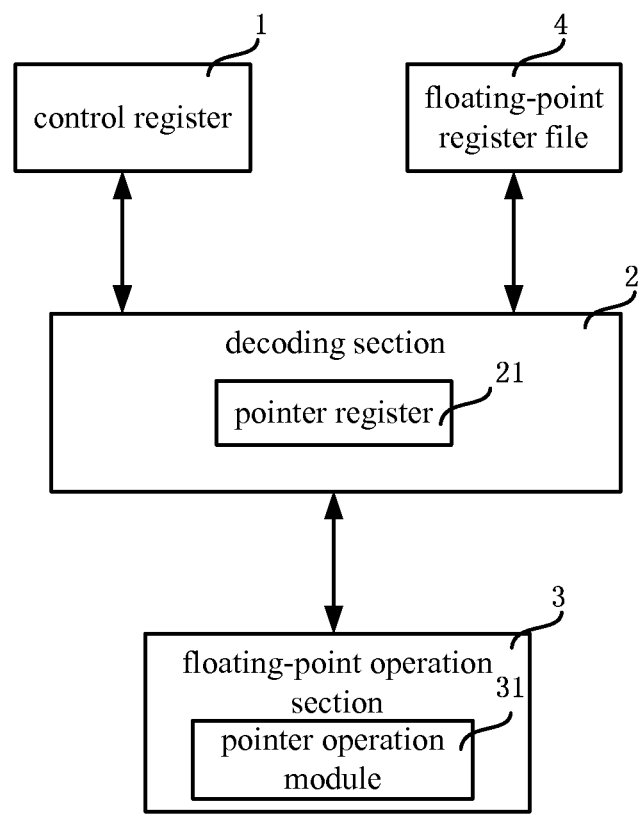
FIG. 1 is a schematic diagram illustrating the structure of a RISC processor according to the present invention.

In order to make the object, technical solution and advantages of the present invention more clear, a RISC processor and a method of emulating a floating-point stack operation in the RISC processor according to the present invention are further explained in detail with reference to the accompanying drawings and examples. It should be understood that the embodiments described here are used only to explain this invention, rather than limit it.

The embodiments describe the RISC processor and the method of emulating a floating-point stack operation in the RISC processor according to the present invention by taking a MIPS64 instruction set-based RISC processor device as an example. However, it should be noted that they are not used to define the claims of the present invention.

In the embodiments of the present invention, a RISC processor and a method of emulating a floating-point stack operation in the RISC processor are provided and applied to the collaborative design of virtual machines, so that a floating-point stack operation of a CISC processor architecture, e.g., a floating-point stack operation in an X86 processor, is supported by a RISC processor.

In order to understand the present invention more deeply, the method of performing a floating-point stack operation in the configuration of a CISC processor system, e.g., an X86 processor, is described first in the embodiments of the present invention.

The floating-point section of an X86 processor comprises a floating-point register stack consisting of 8 stack registers, which may perform floating-point operations directly and which are numbered in sequence, i.e., numbered 0 to 7, respectively. The reason why such registers are called a floating-point register stack is that the X86 processor uses them as a stack. The floating-point register stack is a circular stack extending downwards. The processor uses 3 bits of another register 10 to tag the location of the top of a stack, and the 3 bits are called a Top-of-stack (TOP) pointer.

When there is a need for loading data into a stack register, i.e., stack push, the value of the TOP pointer is decreased by 1, and then the data is stored in a floating-point register indicated by the TOP pointer. When the value of the TOP pointer is 0, the data is pushed into No. 7 stack register in the next stack push and the value of the TOP pointer is set to 7.

When there is a need for storing the data in the stack in a memory, i.e., stack pop, a stack-pop operation is conducted. The stack-pop operation, similar to the stack-push operation, is performed by adding 1 to the value of the TOP pointer. If then the value of the TOP pointer is 7, the value of the TOP pointer after the stack pop will be set to 0.

In the X86 processor, the stack-push and stack-pop operations are automatically realized by hardware, and are transparent for the users.

During the operation of floating-point data via instructions, the floating-point registers that can be seen are ST(0), ST(1), . . . , and ST(7), wherein ST(i) represents a register which is the $i^{th}$ unit away from the top of the stack. If then the value of the TOP pointer is 2, ST(0) will be the $2^{nd}$ register, ST(1) will be the $3^{rd}$ register, and so on and so forth.

The RISC processor device according to the present invention is described in detail hereinafter.

As shown in FIG. 1, the RISC processor according to the present invention comprises: a floating-point register file 4 containing a plurality of floating-point registers, a decoding section 2 for decoding operation instructions of the RISC processor, and a floating-point operation section 3 connected to the decoding section, the floating-point operation section 3 reading and writing the floating-point register file according to the output value of the decoding section so as to perform a floating-point operation.

The RISC processor further comprises a control register 1 for controlling the status of the floating-point registers and controlling the decoding section 2 and the floating-point operation section 3 to enable or prohibit the emulation of a floating-point register stack using the floating-point register file 4. The use of the control register 1 for controlling the status of the floating-point registers is familiar to those skilled in the art. Here, the control register 1 of the present invention is also adapted for controlling the decoding section 2 and the floating-point operation section 3 to enable or prohibit the emulation of a floating-point register stack using the floating-point register file 4.

The control register 1 maintains a stack enable bit. When the enable bit is set to 1, it denotes that the processor will emulate a floating-point register stack operation of the X86 processor; and when the enable bit is set to 0, it denotes that the processor will not emulate a floating-point register stack operation of the X86 processor, and the processor will perform an operation processing according to a normal process.

In the embodiments of the present invention, the floating-point register file 4 contains 32 floating-point registers numbered 0 to 31 for emulating the floating-point register stack of the X86 processor.

The decoding section 2 includes a pointer register 21 for maintaining a TOP pointer, namely, a stack operation pointer, and storing the value of the TOP pointer. The TOP pointer may be read, written, increased by 1 or decreased by 1, etc.

The floating-point operation section 3 includes a pointer operation module 31 for operating the pointer register 21, emulating the stack operation of the stack operation pointer of the pointer register 21, modifying and monitoring the phase of the stack operation pointer during emulating the floating-point register stack operation.

As a mode that can be implemented, if the stack enable bit in the control register 1 is set to 1, the decoding section 2 will convert the numbers of 8 registers among the 32 floating-point registers according to the value of the stack operation pointer, so as to emulate the stack registers numbered 0 to 7 in the floating-point register stack of the X86 processor.

If the stack enable bit in the control register 1 is set to 1, it will be used during the operation, denoting that the floating-point register stack emulated by the registers will exist, thus any register with a number smaller than 8 involved in the floating-point operation instruction will be used as a stack register of the floating-point register stack, so as to emulate the floating-point register stack of the X86 processor.

Thereafter, the pointer operation module 31 uses the TOP pointer to convert the numbers of the stack registers, namely, the number of the floating-point register that a user sees is converted into the number of the floating-point register used by the program. For instance, the number of a register means the number of a register ST(i), which is the $i^{th}$ unit away from the top of the stack, plus the value of the TOP pointer. If the value of the TOP pointer is 2, ST(0) will be the $2^{nd}$ register and ST(1) will be the $3^{rd}$ register. If the number overflows, a corresponding processing will be conducted to make the group of registers form a circular stack and to complete the function to be realized by the present invention, i.e., the function of emulating the floating-point register stack of the X86 processor. Then, the follow-up work, which is the same as the stack enable bit that hasn't been set, is carried out.

If the stack enable bit in the control register 1 is set to 0, i.e., cleared, during the operation, it shall be deemed that the stack emulated by the registers don't exist, and the processor operates normally according to the existing working steps.

Next, a method of emulating a floating-point stack operation in a RISC processor according to the present invention is further described in detail. As shown in FIG. 1, the RISC processor comprises: a floating-point register file 4 containing a plurality of floating-point registers; a control register 1 for controlling the status of the floating-point registers and controlling the decoding section 2 and the floating-point operation section 3 to emulate a floating-point register stack operation using the floating-point register file 4; a decoding section 2 for decoding operation instructions of the RISC processor; and a floating-point operation section 3 connected to the decoding section 2, the floating-point operation section 3 reading and writing the floating-point register file 4 according to the output value of the decoding section 2 so as to perform a floating-point operation; wherein the control register 1 maintains a stack enable bit, the decoding section 2 includes a pointer register 21, and the floating-point operation section 3 includes a pointer operation module 31. The method comprises forming a floating-point register stack of the 8 floating-point registers in the RISC processor, and completing the emulation of a stack operation of the floating-point registers via the control register 1 and by emulating the TOP pointer function of X86, i.e., the stack pointer operation function.

Figure 2:
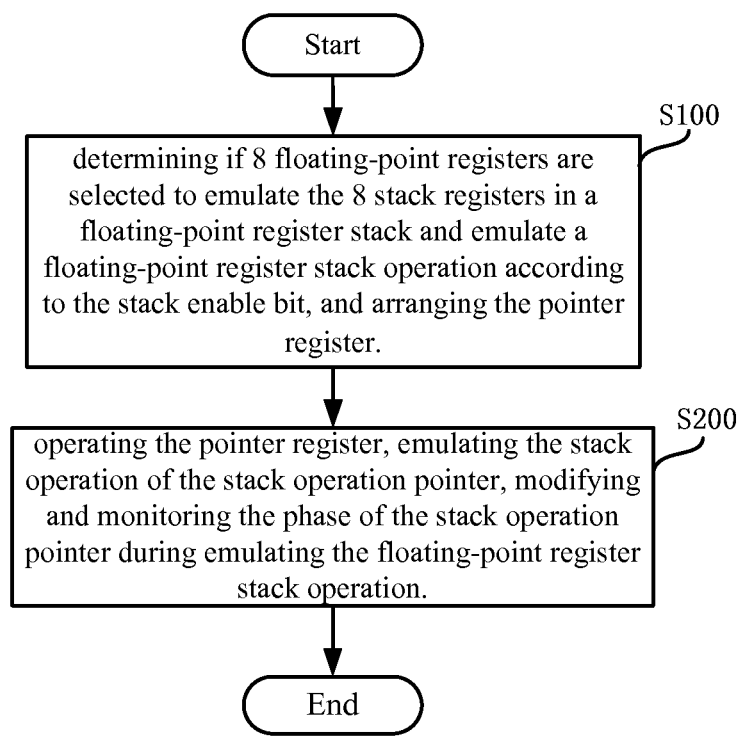
FIG. 2 is a flow chart illustrating emulating a floating-point stack operation in a RISC processor according to the present invention.

The method of emulating a floating-point stack operation in the RISC processor according to the present invention, as shown in FIG. 2, comprises the following steps:

Step S100: determining if 8 floating-point registers are selected to emulate the 8 stack registers in a floating-point register stack and emulate a floating-point register stack operation according to the stack enable bit, and setting the pointer register; and Step S200: operating the pointer register 21 so as to emulate the stack operation of a stack operation pointer, and modify and monitor the status of the stack operation pointer when the floating-point register stack operation is emulated.

The Step S100 includes the following steps:

Step S110: selecting a bit in the control register 1 as a floating-point stack enable bit, wherein it denotes that a floating-point stack of the X86 processor will be emulated to perform a floating-point stack operation when the enable bit is set to 1, and it denotes that a floating-point stack of the X86 processor will not be emulated, a floating-point stack operation can't be performed, and the processor operates according to a normal process when the enable bit is set to 0; and Step S120: setting a pointer register 21 of at least 3 bits to store the value of the TOP pointer.

The value of the TOP pointer may be read, written, increased by 1 or decreased by 1. And, the TOP pointer is in the range of 0-7.

During the stack push, the TOP pointer is pushed into No. 7 register and the value of the TOP pointer is set to 6; if the value of the TOP pointer is 7 during the stack pop, the value of the TOP pointer after the stack pop will be set to 0.

The TOP pointer always points at the top-of-stack register, and the stack grows downwards from the top, namely, the value of the TOP pointer is decreased by 1 during the stack push and increased by 1 during the stack pop, so, when data is stored in No. 7 register (i.e., pushed onto the stack of No. 7 register), the value of the TOP pointer should be decreased by 1 to become 6. When data pops up from No. 7 register, the value of the TOP pointer should be increased by 1 to become 8. But, there are merely 8 registers numbered 0 to 7 in all, so the maximum value of the TOP pointer is 7. When the value is increased by 1, the TOP pointer should point at the next register, namely, No. 0 register in the circular stack, and then the value of the TOP pointer should become 0.

For instance, if the value of the TOP pointer is 3, in the case of an enable bit of 1, if the floating-point register involving in the operation is $f(i): i<=7$, a floating-point register $f(j)$ will substitute for the floating-point register $f(i)$ to conduct the operation, wherein $j=(i+3) \mod 8$;

if the register is $f(i): i>7$, no alteration shall be made and the floating-point register $f(i)$ will be used directly.

The Step S200 includes the following steps:

Step S210: setting a stack operation mode by setting the floating-point stack enable bit to 1 to allow a user to emulate a floating-point register stack to perform a floating-point stack operation;

as a mode that can be implemented, setting a mode of emulating a floating-point stack mode, i.e. setting the bit to 1 in order to set the X86 floating-point stack mode may be executed by the following instruction:

The instruction has a format: SETTM.

The instruction code for the extension instruction provided in the present invention is shown in FIG. 3. Wherein, the extension instruction is defined by the retention value of the empty slot of SPECIAL2 in the MIPS64 Instruction Set.

The operation of setting the enable bit to 1 is completed via the instruction, so as to set the bit for the X86 floating-point stack mode and allow a user to use the X86 floating-point stack to perform a floating-point operation.

Step S220: clearing a stack operation mode by setting the floating-point stack enable bit to 0 to forbid a user to perform a floating-point stack operation by emulating a floating-point register stack;

as a mode that can be implemented, the instruction of clearing the emulated floating-point stack mode and setting the bit to 0 for the X86 floating-point stack mode in the embodiments of the present invention has the following format: CLRTM.

The instruction code for the extension instruction provided in the present invention is shown in FIG. 4.

The bits are cleared for the X86 floating-point stack mode, and the user is not allowed to use the X86 floating-point stack but can only use the floating-point registers of a MIPS processor to perform the floating-point operation.

Said stack pointer operation instructions for bit setting and clearance can complete the activation and disabling of a floating-point register stack, respectively.

Step S230: increasing the value of the stack operation pointer by 1, namely, increasing the value of the TOP pointer by 1;

as a mode that can be implemented, the instruction of increasing the value of the stack pointer by 1, namely, increasing the value of the TOP pointer by 1, in the embodiments of the present invention has the following format: INCTOP.

The instruction code for the extension instruction provided in the present invention is shown in FIG. 5.

Step S240: decreasing the value of the stack operation pointer by 1, namely, decreasing the value of the TOP pointer by 1;

as a mode that can be implemented, the instruction of decreasing the value of the stack pointer by 1, namely, decreasing the value of the TOP pointer by 1, in the embodiments of the present invention has the following format: DECTOP.

The instruction code for the extension instruction provided in the present invention is shown in FIG. 6.

Said instructions of increasing and decreasing the value of the TOP pointer by 1 can emulate the stack-push and stack-pop operations in a floating-point stack of the X86 processor, respectively.

Step S250: reading the value of the stack operation pointer, namely, reading out the value of the TOP pointer;

as a mode that can be implemented, the instruction for the operation of reading out the value of the TOP pointer in the embodiments of the present invention has the following format: MFTOP rd.

The function of the instruction is to read the value of the X86 floating-point top-of-stack pointer into the General Purpose Register (GPR) called GPR[rd].

The instruction code for the extension instruction provided in the present invention is shown in FIG. 7.

Step S260: writing the value of the stack operation pointer, namely, writing the current value of the TOP pointer into the pointer register 21;

as a mode that can be implemented, the instruction for the operation of writing the value of the TOP pointer in the embodiments of the present invention has the following format: MTTOP imm.

The function of the instruction is to write a 3-bit immediate value (imm) into the X86 floating-point top-of-stack pointer.

The instruction code for the extension instruction provided in the present invention is shown in FIG. 8.

Said instructions of reading and writing the TOP pointer may control and operate the floating-point stack conveniently.

In order to better understand the method of emulating a floating-point stack operation in a RISC processor according to the present invention, hereinafter a stack pointer operation in an add operation is taken as an example to illustrate it.

When the enable bit is 1 and the value of the TOP pointer is 2, the operation, add.s $f(6), $f(I), $f(9), is subjected to the following conversions inside the RISC processor:

the operation of emulating an X86 floating-point stack is activated, i.e., the enable bit is set to 1;
$f(6) is replaced by $f(O); //6+2 mod 8 =0
$f(1) is replaced by $f(3); 111+2 mod 8 =3
$f(9) need not be converted; // 9>7 so no conversion is needed and the register $f(9) is used directly.

Eventually, the expression of the operation actually performed is add.s $f(0), $f(3), $f(9). There is no stack-push or stack-pop operation here, so the TOP value won't change.

The detailed process is the same as what's illustrated in the Step S100, which emulates the configuration of the circular stack in the X86, improves the compatibility between processors, makes the binary translations in virtual machines and compilers convenient, and enhances the running efficiency of programs.

The beneficial effect of the present invention is: the RISC processor device and the method of emulating a floating-point stack operation in the RISC processor according to the present invention provide a powerful emulation support, so that the maintenance of a floating-point stack emulation may be omitted, the loss of time and space in reading a memory can be decreased significantly, and the working efficiency can be enhanced. Also, they narrow the differences between different processor system architectures, and make a pathbreaking contribution to the collaborative design of virtual machines and to the compatibility between the RISC processor and the CISC processor.

In light of the drawings illustrating the embodiments of the present invention, other aspects and features of the present invention are obvious to those skilled in the art.

The embodiments of the present invention have been described and illustrated hereinabove. These embodiments should be considered illustrative only, and cannot be used to limit the present invention. The present invention should be interpreted based on the appended claims.

Industrial Applicability

A RISC processor device and a method of emulating a floating-point stack operation in the RISC processor according to the present invention, wherein a floating-point register stack operation is emulated using a floating-point register file via a control register in the RISC processor, and when the stack enable bit in the control register is enable, 8 registers among 32 floating-point registers are selected to emulate the stack registers numbered 0 to 7 in the floating-point register stack of an X86 processor, can support the floating-point stack operation, so as to facilitate virtual machines of different architectures to perform binary translation, enhance the running efficiency of programs and improve the compatibility of the processor.

What claimed is:

1. A Reduced Instruction Set Computing (RISC) processor comprising:
    a floating-point register file containing a plurality of floating-point registers,
    a decoding section for decoding operation instructions of the RISC processor, and
    a floating-point operation section connected to the decoding section for reading and writing the floating-point register file according to an output value of the decoding section so as to perform a floating-point operation, wherein:
    the decoding section includes a pointer register for maintaining a stack operation pointer and storing a value of the stack operation pointer,
    the floating-point operation section includes a pointer operation module, which operates the pointer register so as to emulate a stack operation of the stack operation pointer, and modify and monitor a status of the stack operation pointer when a floating-point register stack operation is emulated,
    the RISC processor includes a control register for controlling the status of the floating-point registers and controlling the decoding section and the floating-point operation section to emulate the floating-point register stack operation using the floating-point register file,
    the control register maintains a stack enable bit, wherein the stack enable bit denotes that the RISC processor will emulate the floating-point register stack operation when the stack enable bit is set to 1, and that the RISC processor will not emulate the floating-point register stack operation when the stack enable bit is set to 0, and
    the value of the stack operation pointer is n, and in the case of the stack enable bit being 1:
        if a floating-point register number i involved in a given operation is equal to or less than 7, a floating-point register number j will be substituted for the floating-point register number i to conduct the given operation, wherein j=(i+n) mod 8, and
        if the floating-point register number i involved in the given operation is more than 7, the floating-point register number i will be used directly to conduct the given operation.

2. The RISC processor according to claim 1, wherein the floating-point register file contains 32 floating-point registers numbered 0 to 31.

3. The RISC processor according to claim 2, wherein when the stack enable bit in the control register is set to 1, the decoding section converts 8 registers among the 32 floating-point registers according to the value of the stack operation pointer, so as to emulate stack registers numbered 0 to 7 in a floating-point register stack of an X86 processor.

4. The RISC processor according to claim 1, wherein the stack operation pointer is a stack operation pointer indicating the operations of reading, writing, plus 1 and minus 1.

5. A method of emulating a floating-point register stack operation in a Reduced Instruction Set Computing (RISC) processor, the RISC processor including a floating-point register file containing a plurality of floating-point registers, a decoding section for decoding operation instructions of the RISC processor, a floating-point operation section connected to the decoding section for reading and writing the floating-point register file according to an output value of the decoding section so as to perform a floating-point operation, and a control register for controlling the decoding section and the floating-point operation section to emulate the floating-point register stack operation using the floating-point register file, wherein the control register maintains a stack enable bit, the decoding section includes a pointer register, and the floating-point operation section includes a pointer operation module, the method comprising the following steps:

Step A: determining if the floating-point registers are selected to emulate the floating-point register stack operation according to the stack enable bit, and setting the pointer register; and Step B: operating the pointer register so as to emulate a stack operation of a stack operation pointer, and modify and monitor a status of the stack operation pointer when the floating-point register stack operation is emulated;

wherein the Step A includes the following steps:

Step A1: selecting a bit in the control register as the stack enable bit, wherein the stack enable bit denotes that the RISC processor emulates a floating-point register stack of an X86 processor and performs the floating-point register stack operation when the stack enable bit is set to 1, and that the RISC processor neither emulates a floating-point register stack of the X86 processor nor performs the floating-point register stack operation when the stack enable bit is set to 0, and Step A2: setting at least 3 bits of the pointer register for storing the value of the stack operation pointer, and the value of the stack operation pointer is n, and in the case of the stack enable bit being 1:

if a floating-point register number i involved in a given operation is equal to or less than 7, using a floating-point register number j to substitute for the floating-point register number i to conduct the given operation, wherein j=(i+n) mod 8, and if the floating-point register number i involved in the given operation is more than 7, using the floating-point register number i directly to conduct the given operation.

6. The method according to claim 5, wherein the Step B includes:
setting a stack operation mode by setting the stack enable bit to 1 to allow a user to emulate the floating-point register stack operation.

7. The method according to claim 5, wherein the Step B includes:
clearing a stack operation mode by setting the stack enable bit to 0 to forbid a user to emulate the floating-point register stack operation.

8. The method according to claim 5, wherein the Step B includes:
increasing the value of the stack operation pointer by 1.

9. The method according to claim 5, wherein the Step B includes:
decreasing the value of the stack operation pointer by 1.

10. The method according to claim 5, wherein the Step B includes:
reading the value of the stack operation pointer.

11. The method according to claim 5, wherein the Step B includes:
writing the value of the stack operation pointer.

12. The method according to claim 5, wherein the Step B includes:
setting a stack operation mode by setting the stack enable bit to 1 to allow a user to emulate the floating-point register stack operation.

13. The method according to claim 5, wherein the Step B includes:
clearing a stack operation mode by setting the stack enable bit to 0 to forbid a user to emulate the floating-point register stack operation.

14. The method according to claim 5, wherein the Step B includes:
increasing the value of the stack operation pointer by 1.

15. The method according to claim 5, wherein the Step B includes:
decreasing the value of the stack operation pointer by 1.

16. The method according to claim 5, wherein the Step B includes:
reading the value of the stack operation pointer.

17. The method according to claim 5, wherein the Step B includes:
writing the value of the stack operation pointer.

* * * * *